United States Patent [19]

Campbell et al.

[11] 4,100,546
[45] Jul. 11, 1978

[54] AIRBORNE ANTENNA SYSTEM EMPLOYING THE AIRFRAME AS AN ANTENNA

[75] Inventors: Donn V. Campbell, Eatontown, N.J.; Edward J. Paragi, New Haven, Ind.

[73] Assignee: The United States of America as represented by the Secretary of the Army, Washington, D.C.

[21] Appl. No.: 763,440

[22] Filed: Jan. 28, 1977

[51] Int. Cl.² ............................................. H01Q 1/28
[52] U.S. Cl. .................................... 343/708; 343/856
[58] Field of Search ............... 343/705, 708, 720, 856, 343/895

[56] References Cited

U.S. PATENT DOCUMENTS

| 2,510,698 | 6/1950 | Johnson | 343/708 |
| 3,365,721 | 1/1968 | Bittner | 343/708 |
| 3,587,102 | 6/1971 | Czerwinski | 343/708 |
| 3,646,562 | 2/1972 | Acker et al. | 343/720 |

FOREIGN PATENT DOCUMENTS 1,430,304  3/1976  United Kingdom ................. 343/708

Primary Examiner—Eli Lieberman
Attorney, Agent, or Firm—Nathan Edelberg; Jeremiah G. Murray; Edward Goldberg

[57] ABSTRACT

A phase front homing system airborne antenna array employing portions of the airframe as two antenna elements.

5 Claims, 2 Drawing Figures

AIRBORNE ANTENNA SYSTEM EMPLOYING THE AIRFRAME AS AN ANTENNA

BACKGROUND OF THE INVENTION

This invention relates to radio direction finding systems adapted for homing operations and more particularly to a unique antenna array for use with phase front homing systems.

Radio direction finding systems enabling aviators to navigate aircraft towards distant beacon transmitters may operate by simply indicating only the sense of direction towards the beacon, i.e. right or left without any indication of the actual angle in degrees. Such simple systems are commonly called homing systems. The pilot observes an indicator on the homing apparatus, such as a needle, and maneuvers his aircraft so as to center the needle and thus "home" on the distant beacon transmitter. It is desirable that such homing systems should function accurately over wide frequency ranges. In the military VHF band, for example, it is desirable that the homing system extend over a relatively wide band extending from 30 to 76 MHz. Usually, however, most conventional homing systems will operated at a limited number of frequencies. Poor broadband performance of conventional homing systems is attributed to such factors as limited dynamic range and AGC charcteristics of radios and, more significantly, the failure of the antenna system to provide symmetrical radiation patterns at all frequencies. To alleviate most of the problems of such conventional homing systems, so called phase front homing systems have been devised. Basically, the phase front homing system derives the desired sense of the direction to the beacon transmitter by utilizing directly the phase difference between the sinals picked up by two antenna elements. In this sense, greater system accuracy is realized because the phase shift between antennas, ideally, is unaffected by amplitude variations. In contrast, the conventional homing system derives its information from both phase and amplitude charcteristics of the antenna array and therefore it is more prone it inaccurate performances. Such phase front homing systems usually employ conventional separate, visible add-on antenna elements such as whips or dipoles. However, it is well known that the phase shift between such separate antenna elements of the homing antenna aray is greatly affected by such factors as the type of aircraft and the location, orientation, and symmetry of the array.

BRIEF SUMMARY OF THE INVENTION

It is an object of the present invention to provide an improved phase homing system antenna wherein the antenna elements are concealed or greatly reduced in pofile.

In accordance with the present invention there is provided a phase front homing system airplane antenna comprising two substantially vertical sections of the airframe of the airplane. Included also are respective metallic toroid coils encompassing each of the vertical airframe sections and electromagnetically coupled thereto. The combination of each vertical section and its associated toroid coil comprises a respective antenna and corresponding terminals of the toroid coils comprise the radio frequency feed terminals to the respective antennas. The phase front homing system derives the desired sense of direction to a prescribed beacon transmitter by utilizing directly the phase difference at the two antenna elements.

DESCRIPTION OF THE PREFERRED EMBODIMENT

Although the present invention is described in connection with a fixed wing or rotary wing aircraft having substantially vertical landing gear struts, it is to be understood that the invention is not to be limited thereto.

Figure 1:
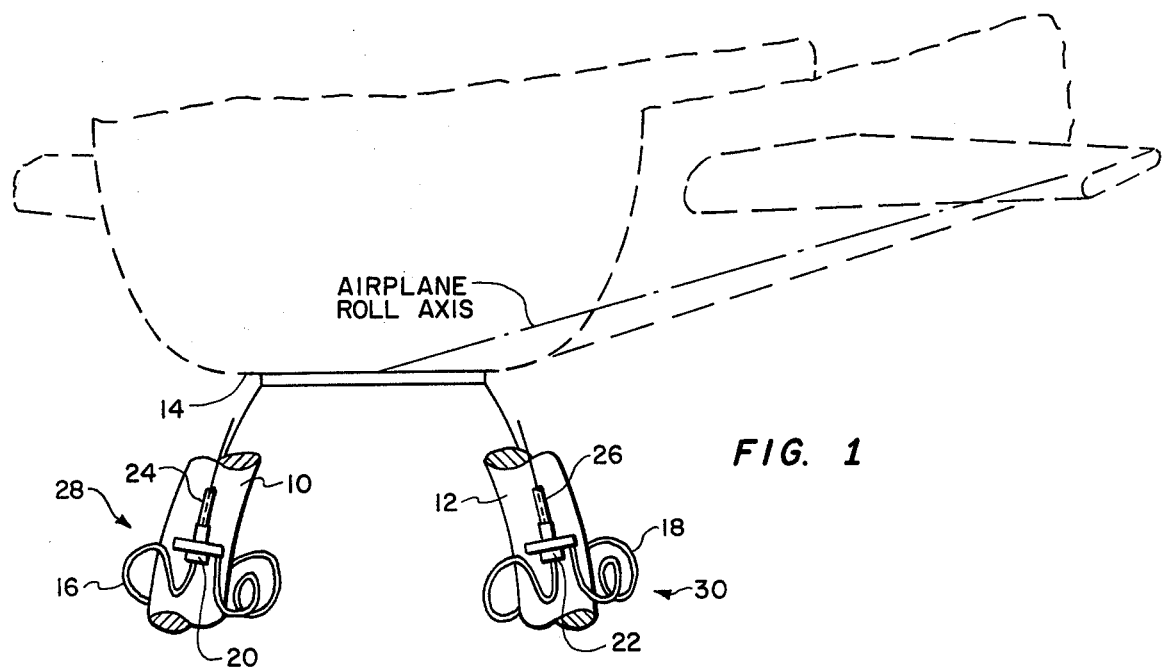
FIG. 1 is a front perspective view schematically illustrating the present invention.

Referring now to FIG. 1 of the drawing, 10 and 12 are the spaced metal struts of the landing gear assembly of a conventional, relatively small, fixed wing or rotary wing aircraft. Struts 10 and 12 are connected to the airframe as shown at 14 and are assumed to be symmetrical with the center line or roll axis of the plane. As shown, the substantially vertical portions of struts 10 and 12 are each girded or encompassed by respective toroidal magnetic coupling coils 16 and 18. One pair of terminals 20 and 22 of respective coupling coils 16 and 18 provide respective antenna feed points of the radio apparatus (not shown) to which the terminals are connected by means of equal length coaxial transmission lines 24 and 26. The remaining pair of terminals of respective coupling coils 16 and 18 are grounded in the usual manner. Each of the coils 16 and 18 surrounding the metallic struts 10 and 12 are oriented in such a way as to be coupled magnetically to current flowing on the metallic struts. The toroidal type of coupler is well known in the art and no further description thereof is believed necessary. The encompassing respective couplers 16 and 18, together with the substantially vertical portions of respective struts 10 and 12, provide two homing antennas which are vertically polarized as is the incident electromagnetic wave of the homing beacon signal. The toroidal couplers 16 and 18 should be symmetrically installed and have similar electrical characteristics.

Figure 2:
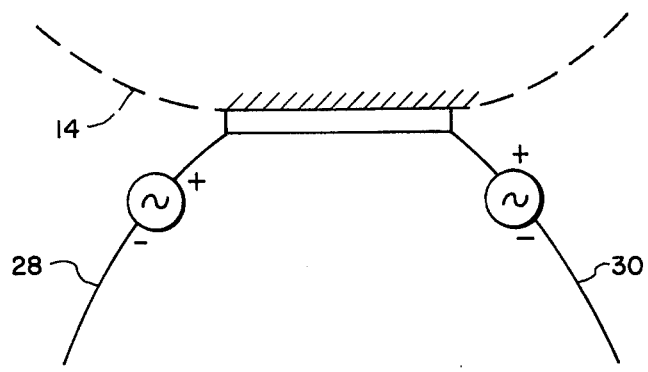
FIG. 2 is a circuit representation of the present invention.

The circuit representation of the strut-antenna homing array is shown in FIG. 2. The antenna 28 on the left represents the antenna formed by strut 10 and toroidal coil 16 while the antenna 30 on the right represents the antenna formed by strut 12 and toroidal coil 18. The polarity shown is necessary to obtain the proper phase relationship of the two strut antennas 28 and 30 and must be observed when connecting the toroidal coils 16 and 18 to their respective transmission lines 24 and 26.

In operation, it has been found that the phase shift characteristics of the strut antennas obtained in the frequency range 30 to nearly 70MHz are ideally suited to phase front homing. The phase nulls occur only at aircraft headings near 0° and near 180° within the 30–70MHz frequency range. Also, it has been found that the radiation pattern of the strut antennas are nominally omnidirectional. It has also been determined that the coupling to the struts increases the strength of the received signal by at least 14dB.

Although the antenna described hereinabove is directed to a homing type antenna, it is to be understood that the antenna is not limited to homing applications but may also be used as a communication antenna. However, when used as a communication antenna some type of impedance matching circuit will be required between the radio apparatus output and the antenna. Such matching circuits are well known and can readily be derived by persons well skilled in the art. It is also to be understood that any convenient metallic structural member of the aircraft can be put to use as an antenna or antenna array as hereinabove described. Furthermore, the operation of the coupling coils may be enhanced by adding ferrous cores made of ferrite or powdered iron.

What is claimed is:

1. A phase front homing airplane antenna array comprising:
    a pair of spaced substantially vertical members of the metallic airframe of said airplane, said members being spaced symmetrically about the longitudinal roll axis of said airplane;
    a pair of like toroidal coils surrounding and electromagnetically coupled to respective portions of said vertical members and positioned symmetrically about said axis, the combination of each of said coils and associated vertical member comprising one of a pair of symmetrical antennas of said array, each coil having a pair of radio frequency feed terminals, and a pair of symmetrical transmission lines connected between respective pairs of said feed terminals and said airplane.

2. The antenna array in accordance with claim 1 wherein said transmission lines are coaxial and include inner and outer conductors connected to said terminals.

3. The antenna array in accordance with claim 1 wherein said terminals of said toroidal coils are connected to respective said transmission lines to provide a like polarity for each of said pair of antennas.

4. The antenna array in accordance with claim 2 wherein said respective toroidal coils couple magnetically to the current flowing in the respective vertical members.

5. The antenna array in accordance with claim 1 wherein said airplane includes symmetrically arranged landing gear struts and said struts comprise said vertical members.

* * * * *